US012803809B2

(12) United States Patent
Wu et al.

(10) Patent No.: US 12,803,809 B2
(45) Date of Patent: Nov. 17, 2026

(54) ZERO-KNOWLEDGE SET MEMBERSHIP PROOF METHOD AND APPARATUS

(71) Applicant: Alipay (Hangzhou) Information Technology Co., Ltd., Hangzhou (CN)

(72) Inventors: Zhenghao Wu, Hangzhou (CN); Jinming Cui, Hangzhou (CN); Xiaojian Liang, Hangzhou (CN); Pu Duan, Sunnyvale, CA (US)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 36 days.

(21) Appl. No.: 19/095,028

(22) Filed: Mar. 31, 2025

(65) Prior Publication Data

US 2026/0019264 A1 Jan. 15, 2026

(51) Int. Cl.
*H04L 9/32* (2006.01)
*H04L 9/30* (2006.01)

(52) U.S. Cl.
CPC .......... *H04L 9/3221* (2013.01); *H04L 9/3066* (2013.01)

(58) Field of Classification Search
None
See application file for complete search history.

(56) References Cited

U.S. PATENT DOCUMENTS

2020/0396075 A1* 12/2020 Visegrady ............. H04L 9/3234
2021/0234840 A1* 7/2021 Afshar ................ H04L 63/0421
2024/0205010 A1* 6/2024 Oh ........................ H04L 9/3033

* cited by examiner

*Primary Examiner* — Nelson S. Giddins

(57) ABSTRACT

Embodiments of this specification provide a zero-knowledge set membership proof method and apparatus. User equipment receives, from a verifier device, a subset S' whose size is η in a set S; calculates two public values based on a parameter set disclosed by a third party, an element u, and an evidence σ, and sends the two public values to the verifier device to calculate a third public value; calculates η groups of random statements based on η groups of generated random numbers and the three public values, and sends the η groups of random statements to the verifier device; receives a random challenge c from the verifier device; and sends η groups of data proofs. The verifier device verifies whether the random statement, the challenge value, and the proof value satisfy a preset relationship, to determine whether the element u owned by the user equipment belongs to the subset S'.

20 Claims, 3 Drawing Sheets

ZERO-KNOWLEDGE SET MEMBERSHIP PROOF METHOD AND APPARATUS

TECHNICAL FIELD

One or more embodiments of this specification relate to the computer field, and in particular, to a zero-knowledge set membership proof method and apparatus.

BACKGROUND

A set membership (SM) proof solution is a conventional cryptographic primitive, and is widely applied to actual scenarios such as a blockchain, anonymous electronic voting, and anonymous credentials. SMs usually include three types of participants: an authority organization, also referred to as an issuer; a user, also referred to as a prover; and a verifier. The issuer is responsible for managing a set S and issuing an evidence. In an SM solution, the prover can prove, to the verifier based on the evidence issued by the issuer, that an element x owned by the prover belongs to a specific set S, that is, $x \in S$. If no information about the element x of the prover and the evidence corresponding to the element x is disclosed in a proof process, such an SM solution is a zero-knowledge set membership (ZKSM) proof solution. The element x and the evidence corresponding to the element x belong to privacy data of the prover.

The ZKSM solution is a research hotspot in the zero-knowledge proof (ZKP) field, and there are many mature solutions. However, in most of the solutions, authorization and verification are performed for a pre-determined entire set S. To be specific, the issuer issues an evidence on $x \in S$ to the prover, and the prover can prove, to the verifier, that the prover owns an element $x \in S$. In an existing solution, a membership proof for a dynamic subset S'S cannot be efficiently implemented. The set S' is any subset of the set S. To be specific, an issuer issues an evidence on $x \in S$, and a prover can prove, based on the evidence, that the prover owns the element $x \in S'$, without exposing a specific value of the element x.

SUMMARY

One or more embodiments of this specification describe a zero-knowledge set membership proof method and apparatus, to efficiently implement a membership proof for a dynamic subset.

According to a first aspect, a zero-knowledge set membership proof method is provided, performed by user equipment. The user equipment owns an element u and an evidence σ issued by a third party to prove that the element u belongs to a set S, and the method includes:

receiving, from a verifier device, a subset S' whose size is η in the set S, and determining that the element u is the $k^{th}$ element in the subset S';

calculating two public values based on a parameter set disclosed by the third party, the element u, and the evidence σ, and sending the two public values to the verifier device, so that the verifier device calculates a third public value based on the sent public values and each element in the subset S';

calculating η groups of random statements based on η groups of generated random numbers and the above-mentioned three public values, and sending the η groups of random statements to the verifier device;

receiving a random challenge c from the verifier device;

constructing η challenge values based on the η groups of random numbers and the random challenge c, where the $k^{th}$ challenge value is calculated in a manner different from that of another challenge value;

constructing η groups of proof values, where the $k^{th}$ group of proof values is determined based on the $k^{th}$ group of random numbers, the $k^{th}$ challenge value, and the element u, and another group of proof values is determined based on a corresponding group of random numbers; and sending η groups of data proofs formed by using η groups of proof values and corresponding challenge values to the verifier device, so that the verifier device verifies whether the η groups of random statements, the η challenge values, and the n group of proof values satisfy a preset relationship, to determine whether the element u owned by the user equipment belongs to the subset S'.

In a possible implementation, the parameter set includes a first parameter $\tilde{g}$ and a second parameter $g_1$, and calculating the two public values based on the parameter set disclosed by the third party, the element u, and the evidence σ includes:

selecting a random number e;

calculating a first public value based on a random number e and a first parameter $\tilde{g}$; and calculating a second public value based on the random number e, the first parameter $\tilde{g}$, a second parameter $g_1$, the element u, and the evidence σ.

Further, the parameter set further includes a third parameter p, and selecting the random number e includes:

randomly selecting an element from an integer multiplication group $\mathbb{Z}_p$ whose modulus is the third parameter p, to obtain a random number e.

Further, the first parameter $\tilde{g}$ is a group generator in an elliptic curve group $\mathbb{G}_1$, and calculating the first public value based on the random number e and the first parameter $\tilde{g}$ includes:

performing an exponential operation by using the first parameter $\tilde{g}$ as a base and by using the random number e as an exponent, to obtain the first public value.

Further, the first parameter $\tilde{g}$ and the second parameter $g_1$ are two group generators in an elliptic curve group $\mathbb{G}_1$, the evidence σ includes an encryption value A and a random number r, and calculating the second public value based on the random number e, the first parameter $\tilde{g}$, the second parameter $g_1$, the element u, and the evidence σ includes:

performing an exponential operation by using the second parameter $g_1$ as a base and using the random number e as an exponent, to obtain a first intermediate value;

performing an exponential operation by using the first parameter $\tilde{g}$ as a base and using a product of the random number e and the element u as an exponent, to obtain a second intermediate value;

performing an exponential operation by using the encryption value A as a base and using an opposite number of a product of the random number e and the random number r as an exponent, to obtain a third intermediate value; and performing a multiplication operation on the first intermediate value, the second intermediate value, and the third intermediate value, to obtain the second open value.

Further, the third public value is η exponential operation result obtained by performing an exponential operation by using the first public value as a base and using each element in the subset S' as an exponent.

Further, the first parameter $\tilde{g}$ and the second parameter $g_1$ are two group generators in an elliptic curve group $\mathbb{G}_1$, and calculating the η groups of random statements based on the η groups of generated random numbers and the above-mentioned three public values includes:

calculating a first statement value in a target group of random statements based on the second public value, the first parameter $\tilde{g}$, the second parameter $g_1$, the evidence σ, the random number e, and a target group of random numbers;

calculating a second statement value in the target group of random statements based on the first public value, the first parameter $\tilde{g}$, and the target group of random numbers; and calculating a third statement value in the target group of random statements based on the third public value, the first parameter $\tilde{g}$, and the target group of random numbers.

Further, the evidence σ includes an encryption value A and a random number r, and calculating the first statement value in the target group of random statements includes:

performing an exponential operation by using the second public value as a base and using a random number $w_j$ in the $j^{th}$ group of random numbers as an exponent, to obtain a first multiplier;

performing an exponential operation by using the second parameter $g_1$ as a base and using a random number $x_j$ in the $j^{th}$ group of random numbers as an exponent, to obtain a second multiplier;

performing an exponential operation by using the first parameter $\tilde{g}$ as a base and using a random number $y_j$ in the $j^{th}$ group of random numbers as an exponent, to obtain a third multiplier;

performing an exponential operation by using the encryption value A as a base and using a product of the random number e and a random number $z_j$ in the $j^{th}$ group of random numbers as an exponent, to obtain a fourth multiplier; and performing a multiplication operation on the first multiplier, the second multiplier, the third multiplier, and the fourth multiplier, where an obtained multiplication result is used as a first statement value in the $j^{th}$ group of random statements.

Further, calculating the second statement value in the target group of random statements includes:

performing an exponential operation by using the first public value as a base and using a random number $w_j$ in the $j^{th}$ group of random numbers as an exponent, to obtain a first exponential result;

performing an exponential operation by using the first parameter $\tilde{g}$ as a base and using a random number $x_j$ in the $j^{th}$ group of random numbers as an exponent, to obtain a second exponential result; and performing a multiplication operation on the first exponential result and the second exponential result, where an obtained multiplication result is used as the second statement value in the $j^{th}$ group of random statements.

Further, calculating the third statement value in the target group of random statements includes:

performing an exponential operation by using the $j^{th}$ value in η values included in the third public value as a base and using a random number $w_j$ in the $j^{th}$ group of random numbers as an exponent, to obtain a first intermediate result;

performing an exponential operation by using the first parameter $\tilde{g}$ as a base and using a random number $y_j$ in the $j^{th}$ group of random numbers as an exponent, to obtain a second intermediate result; and performing a multiplication operation on the first intermediate result and the second intermediate result, where an obtained multiplication result is used as the third statement value in the $j^{th}$ group of random statements.

Further, the random challenge c is obtained by randomly selecting an element from the integer multiplication group $\mathbb{Z}_p$ whose modulus is p.

In a possible implementation, constructing the η challenge values includes:

subtracting the sum of random numbers $w_j$ in the η groups of random numbers from the random challenge c, to obtain the $k^{th}$ challenge value, where j represents the $j^{th}$ group of random numbers; and using each random number $w_j$ in a group of random numbers other than the $k^{th}$ group of random numbers in the η groups of random numbers as the $j^{th}$ challenge value.

In a possible implementation, the evidence σ includes an encryption value A and a random number r, and constructing the η groups of proof values includes:

for the $k^{th}$ group of proof values, obtaining a first proof value by using a random number $x_k$ included in the $k^{th}$ group of random numbers as a minuend and using a product of the $k^{th}$ challenge value and a random number e as a subtrahend; obtaining a second proof value by using a random number $y_k$ included in the $k^{th}$ group of random numbers as a minuend and using a product of the $k^{th}$ challenge value, a random number e, and the element u as a subtrahend; and obtaining a third proof value by using a random number $z_k$ included in the $k^{th}$ group of random numbers as an addend and using a product of the $k^{th}$ challenge value and the random number r as another addend; and for the $j^{th}$ group of proof values when j is unequal to k, using a random number $x_j$ included in the $j^{th}$ group of random numbers as the first proof value, using a random number $y_j$ included in the $j^{th}$ group of random numbers as a second proof value, and using a random number $z_j$ included in the $j^{th}$ group of random numbers as a third proof value.

According to a second aspect, a zero-knowledge set membership proof method is provided, performed by a verifier device. The verifier device owns a set S, and the method includes:

sending a subset S' whose size is η in the set S to the user equipment;

receiving two public values from the user equipment, where the two public values are calculated based on a parameter set disclosed by a third party, an element u, and an evidence σ issued by the third party to prove that the element u belongs to the set S;

calculating a third public value based on the two public values and each element in the subset S';

receiving η groups of random statements from the user equipment, where the η groups of random statements are calculated based on the η groups of generated random numbers and the above-mentioned three public values;

sending a random challenge c to the user equipment;

receiving, from the user equipment, η groups of data proofs formed by using n groups of proof values and corresponding challenge values, where the η challenge values are constructed based on the η groups of random numbers and the random challenge c, the $k^{th}$ challenge value is calculated in a manner different from that of another challenge value, the $k^{th}$ group of proof values is determined based on the $k^{th}$ group of random numbers, the $k^{th}$ challenge value, and the element u, and another group of proof values is determined based on a corresponding group of random numbers; and verifying whether the η groups of random statements, the η challenge values, and the η group of proof values satisfy a preset relationship, to determine whether the element u owned by the user equipment belongs to the subset S'.

In a possible implementation, determining whether the element u owned by the user equipment belongs to the subset S' includes:

verifying whether a first equation, a second equation, and a third equation are satisfied, where the first equation is used to represent a relationship between the η challenge values and the random challenge c, the second equation is used to represent a relationship between the η groups of random statements and the η groups of proof values, and the third equation is used to represent a relationship between a public value and the evidence σ; and when the first equation, the second equation, and the third equation are all satisfied, determining that the element u owned by the user equipment belongs to the subset S'; or when at least one of the first equation, the second equation, and the third equation is not satisfied, determining that the element u owned by the user equipment does not belong to the subset S'.

Further, the first equation is that the sum of the η challenge values is equal to the random challenge c.

Further, the parameter set includes a first parameter $\tilde{g}$ and a second parameter $g_1$, the first parameter $\tilde{g}$ and the second parameter $g_1$ are two group generators in an elliptic curve group $\mathbb{G}_1$, the evidence σ includes an encryption value A and a random number r, and the method further includes:

receiving, from the user equipment, a processing value corresponding to the encryption value A, where the processing value is obtained by performing an exponential operation by using the encryption value A as a base and using a random number e as an exponent; and verifying whether the second equation is satisfied includes:

obtaining the $j^{th}$ group of first calculation results based on a second public value, the $j^{th}$ challenge value, the first parameter $\tilde{g}$, the second parameter $g_1$, the processing value, and the $j^{th}$ group of proof values;

obtaining the $j^{th}$ group of second calculation results based on a first public value, the $j^{th}$ challenge value, the first parameter $\tilde{g}$, and the $j^{th}$ group of proof values;

obtaining the $j^{th}$ group of third calculation results based on a third public value, the $j^{th}$ challenge value, the first parameter $\tilde{g}$, and the $j^{th}$ group of proof values; and if a first statement value included in the $j^{th}$ group of random statements is equal to the $j^{th}$ group of first calculation results, a second statement value included in the $j^{th}$ group of random statements is equal to the $j^{th}$ group of second calculation results, and a third statement value included in the $j^{th}$ group of random statements is equal to the $j^{th}$ group of third calculation results, determining that the second equation is satisfied.

Further, the parameter set includes a third parameter $g_2$, the third parameter $g_2$ is a group generator in an elliptic curve group $\mathbb{G}_2$, the evidence σ includes an encryption value A and a random number r, the encryption value A is obtained by encrypting the element u by using a private key, and a public key is disclosed to the verifier device, and the method further includes:

receiving, from the user equipment, a processing value corresponding to the encryption value A, where the processing value is obtained by performing an exponential operation by using the encryption value A as a base and using a random number e as an exponent; and verifying whether the third equation is satisfied includes:

performing bilinear mapping for a second public value and a common parameter $g_2$, to obtain a first mapping result;

performing bilinear mapping for the processing value and the public key, to obtain a second mapping result; and when the first mapping result is equal to the second mapping result, determining that the third equation is satisfied.

According to a third aspect, a zero-knowledge set membership proof apparatus is provided. The apparatus is disposed in user equipment, the user equipment owns an element u and an evidence σ issued by a third party to prove that the element u belongs to a set S, and the apparatus includes:

a receiving unit, configured to: receive, from a verifier device, a subset S' whose size is η in the set S, and determine that the element u is the $k^{th}$ element in the subset S';

a first calculation unit, configured to: calculate two public values based on a parameter set disclosed by the third party, the element u, and the evidence σ, and send the two public values to the verifier device by using a sending unit, so that the verifier device calculates a third public value based on the sent public values and each element in the subset S';

a second calculation unit, configured to: calculate η groups of random statements based on η groups of generated random numbers and the above-mentioned three public values, and send the η groups of random statements to the verifier device by using the sending unit, where the receiving unit is further configured to receive a random challenge c from the verifier device;

a third calculation unit, configured to construct η challenge values based on the η groups of random numbers and the random challenge c received by the receiving unit, where the $k^{th}$ challenge value is calculated in a manner different from that of another challenge value; and a fourth calculation unit, configured to construct η groups of proof values, where the $k^{th}$ group of proof values is determined based on the $k^{th}$ group of random numbers, the $k^{th}$ challenge value obtained by the third calculation unit, and the element u, and another group of proof values is determined based on a corresponding group of random numbers, where the sending unit is further configured to send η groups of data proofs formed by using η groups of proof values obtained by the fourth calculation unit and corresponding challenge values obtained by the third calculation unit to the verifier device, so that the verifier device verifies whether the η groups of random statements, the η challenge values, and the η group of proof values satisfy a preset relationship, to determine whether the element u owned by the user equipment belongs to the subset S'.

According to a fourth aspect, a zero-knowledge set membership proof apparatus is provided. The apparatus is disposed in a verifier device, the verifier device owns a set S, and the apparatus includes:

a sending unit, configured to send a subset S' whose size is η in the set S to the user equipment;

a receiving unit, configured to receive two public values from the user equipment, where the two public values are calculated based on a parameter set disclosed by a third party, an element u, and an evidence σ issued by the third party to prove that the element u belongs to the set S;

a calculation unit, configured to calculate a third public value based on the two public values received by the receiving unit and each element in the subset S', where the receiving unit is further configured to receive η groups of random statements from the user equipment, where the η groups of random statements are calculated based on the η groups of generated random numbers and the above-mentioned three public values;

the sending unit is further configured to send a random challenge c to the user equipment; and the receiving unit is further configured to receive, from the user equipment, η groups of data proofs formed by using η groups of proof values and corresponding challenge values, where the η challenge values are constructed based on the η groups of random numbers and the random challenge c, the $k^{th}$ challenge value is calculated in a manner different from that of another challenge value, the $k^{th}$ group of proof values is determined based on the $k^{th}$ group of random numbers, the $k^{th}$ challenge value, and the element u, and another group of proof values is determined based on a corresponding group of random numbers; and a verification unit, configured to verify whether the η groups of random statements received by the receiving unit, the η challenge values, and the η group of proof values satisfy a preset relationship, to determine whether the element u owned by the user equipment belongs to the subset S'.

According to a fifth aspect, a computer-readable storage medium is provided. The computer-readable storage medium stores a computer program, and when the computer program is executed in a computer, the computer is enabled to perform the method according to the first aspect or the second aspect.

According to a sixth aspect, a computing device is provided, including a memory and a processor. The memory stores executable code, and when the processor executes the executable code, the method according to the first aspect or the second aspect is implemented.

According to the method and apparatus provided in the embodiments of this specification, the user equipment owns the element u and the evidence σ issued by the third party to prove that the element u belongs to the set S. The verifier device owns the set S. First, the user equipment receives, from the verifier device, the subset S' whose size is η in the set S, and determines that the element u is the $k^{th}$ element in the subset S'. Then, the user equipment and the verifier device each obtain three public values, and the user equipment calculates η groups of random statements, and sends the η groups of random statements to the verifier device. Next, the user equipment receives the random challenge c from the verifier device, and constructs the η challenge values based on the random challenge c. The $k^{th}$ challenge value is calculated in a manner different from that of another challenge value. The user equipment constructs the η groups of proof values. Finally, the user equipment sends the η groups of data proofs formed by using the η groups of proof values and the corresponding challenge values to the verifier device. The verifier device verifies whether the η groups of random statements, the η challenge values, and the η groups of proof values satisfy the preset relationship, to determine whether the element u owned by the user equipment belongs to the subset S'. In this solution, the elements u and the evidence σ that are owned by the user equipment are not disclosed. Based on a basic framework of a zero-knowledge proof, a membership proof for a dynamic subset cannot be efficiently implemented.

BRIEF DESCRIPTION OF DRAWINGS

To describe the technical solutions in the embodiments of the present invention more clearly, the following briefly describes the accompanying drawings needed for describing the embodiments. Clearly, the accompanying drawings in the following description show merely some embodiments of the present invention, and a person of ordinary skill in the art can derive other drawings from these accompanying drawings without creative efforts.

DESCRIPTION OF EMBODIMENTS

The solutions provided in this specification are described below with reference to the accompanying drawings.

Figure 1:
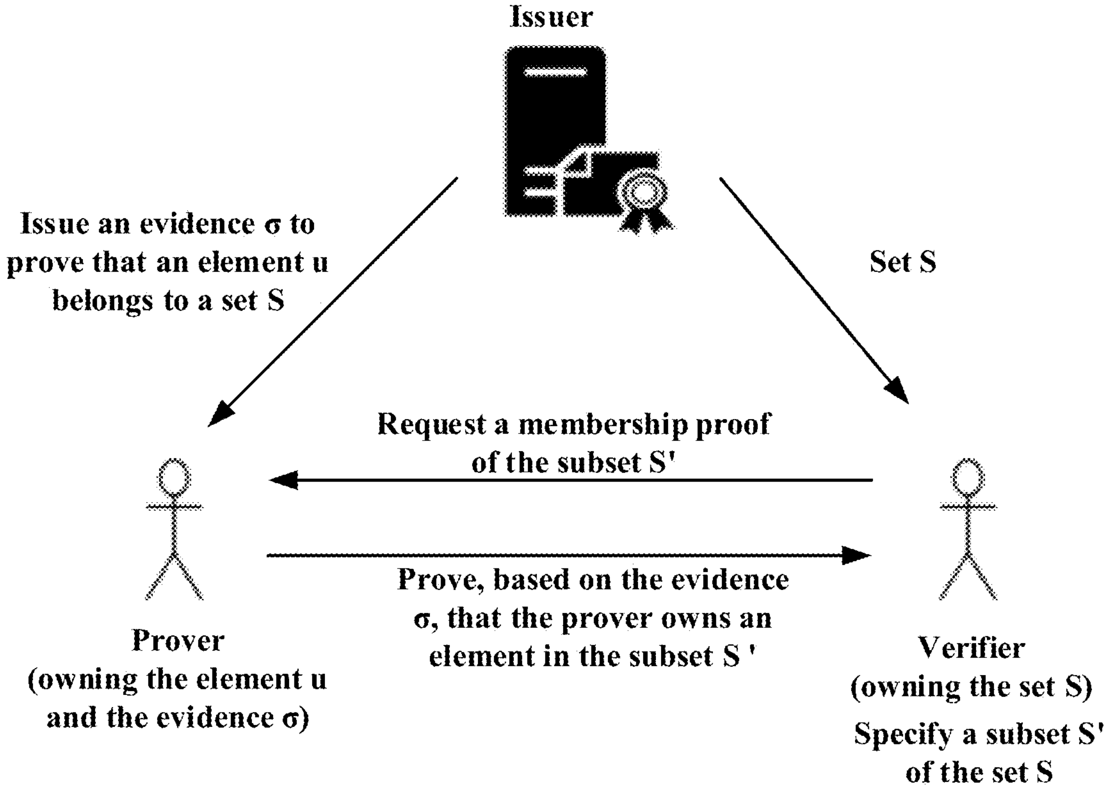
FIG. 1 is a schematic diagram of an implementation scenario according to an embodiment of this specification.

FIG. 1 is a schematic diagram of an implementation scenario according to an embodiment disclosed in this specification. This implementation scenario relates to a zero-knowledge set membership proof. As shown in FIG. 1, the proof is implemented jointly by an issuer, a prover, and a verifier. The issuer issues, to the prover, an evidence σ to prove that an element u belongs to a set S, and sends the set S to the verifier. The verifier owns the set S, specifies a subset S' of the set S, sends the subset S' to the prover, and requests a membership proof of the subset S'. The prover owns the element u and the evidence σ, and proves, to the verifier based on the evidence σ, that the prover owns an element in the subset S'.

In this embodiment of this specification, a membership proof for a dynamic subset $S' \subseteq S$ can be efficiently implemented. The set S' is any subset of the set S. To be specific, the issuer issues an evidence on $x \in S$, and the prover can prove, based on the evidence, that the prover owns the element $x \in S'$, without exposing a specific value of the element x.

It should be noted that the three parties that are the issuer, the prover, and the verifier can be separately implemented as any device, platform, server, or device cluster that has a computing and processing capability.

The following briefly describes functions, algorithms, and protocols that need to be used in this embodiment of this specification.

First, a bilinear mapping (Pairing) function is introduced.

Bilinear mapping e: $\mathbb{G}_1 \times \mathbb{G}_2 \mathbb{G}_t$ is mapping group elements of two elliptic curve groups ($\mathbb{G}_1$, $\mathbb{G}_2$) on an elliptic curve onto a finite field ($\mathbb{G}_t$), and the mapping is bilinear. That is, for any $g \in \mathbb{G}_1$, $h \in \mathbb{G}_2$, a, $b \in \mathbb{Z}_p$ and $e(g^a, h^b)=e(g, h)^{ab}$, $\mathbb{G}_1$, $\mathbb{G}_2$, and $\mathbb{G}_t$ are a multiplicative cyclic group whose order is p, and $\mathbb{Z}_p$ is an integer multiplication group whose modulus is p.

Then, a BBS signature algorithm is introduced.

A BBS signature is a signature algorithm, and in particular, is a group signature scheme, can sign a plurality of plaintext messages, and includes four algorithms (BBS. Setup, BBS. KeyGen, BBS.Sign, BBS.Verify).

$pp=(p, g_1, \tilde{g}, g_2, \mathbb{G}_1, \mathbb{G}_2, \mathbb{G}_t, e) \leftarrow BBS.Setup(1^\lambda, \ell)$ is an initialization algorithm. p, $\mathbb{G}_1$, $\mathbb{G}_2$, $\mathbb{G}_t$ are obtained by running an elliptic curve group generation algorithm based on a security parameter λ, $g_1$, $\tilde{g}$ are obtained by randomly selecting $\ell+1$ elements from a group $\mathbb{G}_1$ as group generators, and $g_2$ is obtained by randomly selecting one element from the group $\mathbb{G}_2$ as a group generator. $\ell$ indicates that the BBS signature supports to sign a maximum of $\ell$ messages, and e(•, •) indicates bilinear mapping.

(sk, pk)←BBS.KeyGen(pp) is a key generation algorithm, $$x \overset{\$}{\leftarrow} \mathbb{Z}_p,$$

an element x is randomly selected from a group $\mathbb{Z}_p$ as a private key sk=x, and a public key is $$pk = g_2^x.$$

σ←BBS.Sign(sk=x,m) is a signature algorithm. A plaintext vector $$m \in \mathbb{Z}_p^{|m|}$$

is signed by using the private key sk. A length |m| of the messages should be less than $\ell$.

$$C = g_1 \prod_{i \in |m|} \tilde{g}_i^{m_i} \in \mathbb{G}_1, r \overset{\$}{\leftarrow} \mathbb{Z}_p, A = C^{\frac{1}{x+r}} \in \mathbb{G}_1, \sigma = (A, r).$$

$$r \overset{\$}{\leftarrow} \mathbb{Z}_p$$

indicates to randomly select an element from a group $\mathbb{Z}_p$, and a signature σ is returned.

1\0←BBS.Verify(pk,m,σ):

$$C = g_1 \prod_{i \in |m|} \tilde{g}_i^{m_i}$$

is calculated. If $$e(A, g_2^r pk) = e(C, g_2),$$

verification succeeds, and 1 is returned; otherwise, verification fails, and 0 is returned.

For BBS.Sign and BBS.Verify, it is considered by default that a common parameter pp is input.

Finally, a Sigma type ZKP protocol is introduced.

A Sigma type is a common specific ZKP protocol, and is used to use zero knowledge to prove that one or more public values (for example, $y_1$ or $y_1, y_2, y_3, \ldots$) have an index x, or that a plurality of indexes have a specific linear relationship. In a case of one public value, for a group generator $g_1 \in \mathbb{G}_1$, and any $x \in \mathbb{Z}_p$, the prover can prove $$y_1 = g_1^x \in \mathbb{G}_1.$$

A proof process is as follows:

The prover calculates a random statement, selects a random number $$k \overset{\$}{\leftarrow} \mathbb{Z}_p,$$

calculates $$t_1 = g_1^k,$$

and sends $t_1$ to the prover.

The verifier selects a challenge $$c \overset{\$}{\leftarrow} C.$$

$\mathcal{C}$ is challenge space, and can be set to $\mathbb{Z}_p$ in an instance. The challenge c is sent to the prover.

The prover calculates s=k−cx, and returns s to the verifier.

The verifier performs verification, to check whether an equation $$t_1 = ? g_1^s \cdot y_1^c$$

is satisfied. If yes, verification succeeds; otherwise, verification fails.

The embodiments of this specification provide a new solution based on the above-mentioned function, algorithm, and protocol, to efficiently implement a membership proof $x \in S'$ for a dynamic subset $S' \subseteq S$.

The following shows, in a table, symbols and meanings mainly used in subsequent embodiments of this specification, for ease of understanding by comparison.

TABLE 1

Symbols and corresponding meanings

| Symbol | Meaning |
|---|---|
| S | Set |
| Element u ∈ S | Element u in the set |
| x, **x** | x represents a single element, and **x** in bold represents a vector |
| e(·, ·) | Bilinear mapping |

TABLE 1-continued

| Symbols and corresponding meanings | |
|---|---|
| Symbol | Meaning |
| $\mathbb{G}_1, \mathbb{G}_2$ | Elliptic curve group |
| $\mathbb{G}_t$ | Target finite field in bilinear mapping |
| $\mathbb{Z}_p$ | Integer group whose modulus is p |
| [η] | Range from 1 to η |

Figure 2:
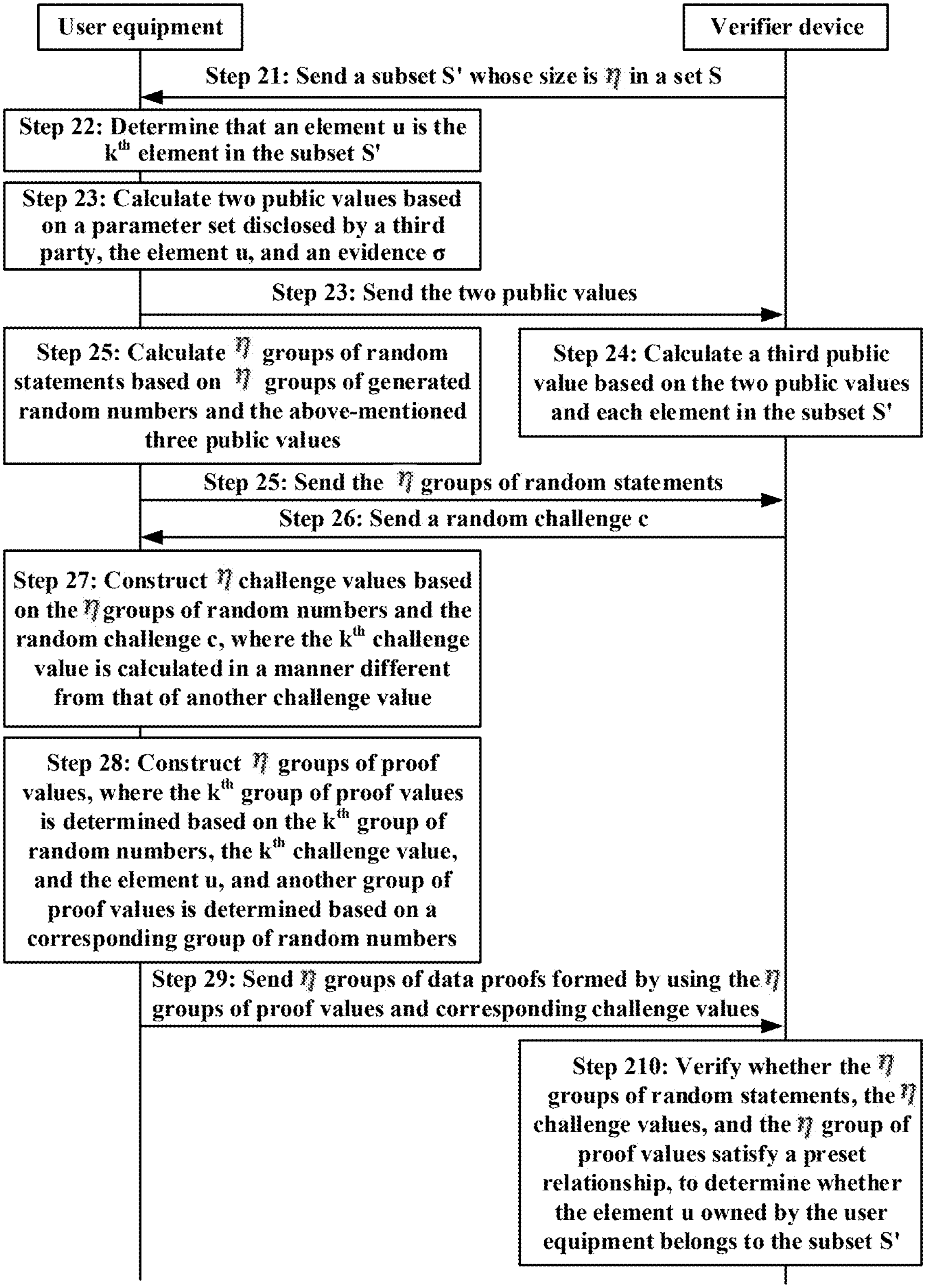
FIG. 2 is an interaction diagram of a zero-knowledge set membership proof method according to an embodiment.

FIG. 2 is an interaction diagram of a zero-knowledge set membership proof method according to an embodiment. The method can be based on the implementation scenario shown in FIG. 1. User equipment corresponds to the above-mentioned prover, a verifier device corresponds to the above-mentioned verifier, and a third party corresponds to the above-mentioned issuer. The user equipment owns an element u and an evidence σ issued by the third party to prove that the element u belongs to a set S. The verifier device owns the set S. FIG. 2 shows an interaction processing procedure between the user equipment and the verifier device. As shown in FIG. 2, the zero-knowledge set membership proof method in this embodiment includes the following steps: Step 21: The verifier device sends a subset S' whose size is η in the set S to the user equipment. Step 22: The user equipment determines that the element u is the $k^{th}$ element in the subset S'. Step 23: The user equipment calculates two public values based on a parameter set disclosed by the third party, the element u, and the evidence σ, and sends the two public values to the verifier device. Step 24: The verifier device calculates a third public value based on the two public values and each element in the subset S'. Step 25: The user equipment calculates η groups of random statements based on η groups of generated random numbers and the above-mentioned three public values, and sends the η groups of random statements to the verifier device. Step 26: The verifier device sends a random challenge c to the user equipment. Step 27: The user equipment constructs η challenge values based on the η groups of random numbers and the random challenge c, where the $k^{th}$ challenge value is calculated in a manner different from that of another challenge value. Step 28: The user equipment constructs η groups of proof values, where the $k^{th}$ group of proof values is determined based on the $k^{th}$ group of random numbers, the $k^{th}$ challenge value, and the element u, and another group of proof values is determined based on a corresponding group of random numbers. Step 29: The user equipment sends, to the verifier device, η groups of data proofs formed by using η groups of proof value and corresponding challenge values. Step 210: The verifier device verifies whether η groups of random statements, η challenge values, and η groups of proof values satisfy a preset relationship, to determine whether the element u owned by the user equipment belongs to the subset S'. The following describes specific execution manners of the above-mentioned steps.

First, in step 21, the verifier device sends the subset S' whose size is η in the set S to the user equipment. It can be understood that, S'⊆S, and a quantity of elements in the subset S' is η.

In this embodiment of the specification, the subset S' can be any non-empty subset of the set S, and both the user equipment and the verifier device can learn of each element in the subset S'.

Then, in step 22, the user equipment determines that the element u is the $k^{th}$ element in the subset S'. It can be understood that each element in the subset S' has a specific sequence, and can be sequentially referred to as the $1^{st}$ element, the $2^{nd}$ element, etc. in sequence.

In this embodiment of this specification, the user equipment can learn of each element in the subset S', and can determine a ranking of the element u in the subset S' by comparing the element u and each element.

Next, in step 23, the user equipment calculates the two public values based on the parameter set disclosed by the third party, the element u, and the evidence σ, and sends the two public values to the verifier device. It can be understood that the element u and the evidence σ are not disclosed based on the above-mentioned two public values.

In an example, the parameter set includes a first parameter $\tilde{g}$ and a second parameter $g_1$, and calculating the two public values based on the parameter set disclosed by the third party, the element u, and the evidence σ includes:

selecting a random number e;

calculating a first public value based on a random number e and a first parameter $\tilde{g}$; and calculating a second public value based on the random number e, the first parameter $\tilde{g}$, a second parameter $g_1$, the element u, and the evidence σ.

In this example, the first public value and the second public value calculated by introducing the random number e. Because the verifier device does not learn of the random number e, the verifier device cannot determine the element u and the evidence σ based on the first public value and the second public value.

Further, the parameter set further includes a third parameter p, and selecting the random number e includes:

randomly selecting an element from an integer multiplication group $\mathbb{Z}_p$ whose modulus is the third parameter p, to obtain a random number e.

Further, the first parameter $\tilde{g}$ is a group generator in an elliptic curve group $\mathbb{G}_1$, and calculating the first public value based on the random number e and the first parameter $\tilde{g}$ includes:

performing an exponential operation by using the first parameter $\tilde{g}$ as a base and by using the random number e as an exponent, to obtain the first public value.

For example, the first public value is $\tilde{g}^e$.

Further, the first parameter $\tilde{g}$ and the second parameter $g_1$ are two group generators in an elliptic curve group $\mathbb{G}_1$, the evidence σ includes an encryption value A and a random number r, and calculating the second public value based on the random number e, the first parameter $\tilde{g}$, the second parameter $g_1$, the element u, and the evidence σ includes:

performing an exponential operation by using the second parameter $g_1$ as a base and using the random number e as an exponent, to obtain a first intermediate value;

performing an exponential operation by using the first parameter $\tilde{g}$ as a base and using a product of the random number e and the element u as an exponent, to obtain a second intermediate value;

performing an exponential operation by using the encryption value A as a base and using an opposite number of a product of the random number e and the random number r as an exponent, to obtain a third intermediate value; and performing a multiplication operation on the first intermediate value, the second intermediate value, and the third intermediate value, to obtain the second open value.

For example, the second public value is $$\overline{B}=g_1^e\tilde{g}^{eu}\overline{A}^{-r},\ \overline{A}=A^e.$$

Then, in step 24, the verifier device calculates the third public value based on the two public values and each element in the subset S'. It can be understood that the user equipment can obtain the third public value in the same calculation manner.

In an example, the third public value is η exponential operation result obtained by performing an exponential operation by using the first public value as a base and using each element in the subset S' as an exponent.

For example, the first public value is $\tilde{g}^e$, the element in the subset S' is represented as $u_j \in S'$, $j \in [\eta]$, and the third public value $\{\tilde{g}^{eu_j}\}_{j\in[\eta]}$ is calculated. $j \in [\eta]$ represents an integer in a range from 1 to η.

Next, in step 25, the user equipment calculates the η groups of random statements based on the η groups of generated random numbers and the above-mentioned three public values, and sends the η groups of random statements to the verifier device. It can be understood that each group of random statements includes a plurality of statement values.

In an example, the first parameter $\tilde{g}$ and the second parameter $g_1$ are two group generators in an elliptic curve group $\mathbb{G}_1$, and the calculating η groups of random statements based on η groups of generated random numbers and the above-mentioned three public values includes:

- calculating a first statement value in a target group of random statements based on the second public value, the first parameter $\tilde{g}$, the second parameter $g_1$, the evidence σ, the random number e, and a target group of random numbers;
- calculating a second statement value in the target group of random statements based on the first public value, the first parameter $\tilde{g}$, and the target group of random numbers; and
- calculating a third statement value in the target group of random statements based on the third public value, the first parameter $\tilde{g}$, and the target group of random numbers.

Further, the evidence σ includes an encryption value A and a random number r, and calculating the first statement value in the target group of random statements includes:

- performing an exponential operation by using the second public value as a base and using a random number $w_j$ in the $j^{th}$ group of random numbers as an exponent, to obtain a first multiplier;
- performing an exponential operation by using the second parameter $g_1$ as a base and using a random number $x_j$ in the $j^{th}$ group of random numbers as an exponent, to obtain a second multiplier;
- performing an exponential operation by using the first parameter $\tilde{g}$ as a base and using a random number $y_j$ in the $j^{th}$ group of random numbers as an exponent, to obtain a third multiplier;
- performing an exponential operation by using the encryption value A as a base and using a product of the random number e and a random number $z_j$ in the $j^{th}$ group of random numbers as an exponent, to obtain a fourth multiplier; and
- performing a multiplication operation on the first multiplier, the second multiplier, the third multiplier, and the fourth multiplier, where an obtained multiplication result is used as a first statement value in the $j^{th}$ group of random statements.

For example, for all $j \in [\eta]$, random numbers $x_j$, $y_j$, $z_j$, $w_j$ are selected. When j=k, it is assumed that $w_k=0$. The first statement value $$rnd_{1,j}=\overline{B}^{w_j}\cdot g_1^{x_j}\cdot\tilde{g}^{y_j}\cdot\overline{A}^{z_j}$$

is calculated.

Further, calculating the second statement value in the target group of random statements includes:

- performing an exponential operation by using the first public value as a base and using a random number $w_j$ in the $j^{th}$ group of random numbers as an exponent, to obtain a first exponential result;
- performing an exponential operation by using the first parameter $\tilde{g}$ as a base and using a random number $x_j$ in the $j^{th}$ group of random numbers as an exponent, to obtain a second exponential result; and
- performing a multiplication operation on the first exponential result and the second exponential result, where an obtained multiplication result is used as the second statement value in the $j^{th}$ group of random statements.

For example, for all $j \in [\eta]$, random numbers $x_j$, $y_j$, $z_j$, $w_j$ are selected. When j=k, it is assumed that $w_k=0$. The second statement value $rnd_{2,j}=\tilde{g}^{ew_j}\cdot\tilde{g}^{x_j}$ is calculated.

Further, calculating the third statement value in the target group of random statements includes:

- performing an exponential operation by using the $j^{th}$ value in η values included in the third public value as a base and using a random number $w_j$ in the $j^{th}$ group of random numbers as an exponent, to obtain a first intermediate result;
- performing an exponential operation by using the first parameter $\tilde{g}$ as a base and using a random number $y_j$ in the $j^{th}$ group of random numbers as an exponent, to obtain a second intermediate result; and
- performing a multiplication operation on the first intermediate result and the second intermediate result, where an obtained multiplication result is used as the third statement value in the $j^{th}$ group of random statements.

For example, for all $j \in [\eta]$, random numbers $x_j$, $y_j$, $z_j$, $w_j$ are selected. When j=k, it is assumed that $w_k=0$. The third statement value $rnd_{3,j}=\tilde{g}^{eu_jw_j}\tilde{g}^{y_j}$ is calculated.

Then, in step 26, the verifier device sends the random challenge c to the user equipment. It can be understood that the random challenge c is randomly selected by the verifier device.

In an example, the random challenge c is obtained by randomly selecting an element from the integer multiplication group $\mathbb{Z}_p$ whose modulus is p.

For example, a random challenge $$c\overset{\$}{\leftarrow}\mathbb{Z}_p$$

is selected.

Next, in step 27, the user equipment constructs η challenge values based on the η groups of random numbers and the random challenge c, where the $k^{th}$ challenge value is calculated in a manner different from that of another challenge value. It can be understood that the user equipment owns the $k^{th}$ element in the subset S', and it can be considered that the $k^{th}$ challenge value corresponds to the $k^{th}$ element.

In an example, constructing the η challenge values includes:

subtracting the sum of random numbers $w_j$ in the η groups of random numbers from the random challenge c, to obtain the $k^{th}$ challenge value, where j represents the $j^{th}$ group of random numbers; and using each random number $w_j$ in a group of random numbers other than the $k^{th}$ group of random numbers in the η groups of random numbers as the $j^{th}$ challenge value.

For example, η challenge values of the challenge c are constructed.

$$\left\{c_1 = w_1, \ldots , c_k = c - \sum\nolimits_{j=1}^{\eta} w_j, \ldots , c_\eta = w_\eta\right\}.$$

Then, in step 28, the user equipment constructs the η groups of proof values. The $k^{th}$ group of proof values is determined based on the $k^{th}$ group of random numbers, the $k^{th}$ challenge value, and the element u, and the another group of proof values is determined based on the corresponding group of random numbers. It can be understood that each group of proof values includes a plurality of proof values.

In an example, the evidence σ includes an encryption value A and a random number r, and constructing the η groups of proof values includes:

for the $k^{th}$ group of proof values, obtaining a first proof value by using a random number $x_k$ included in the $k^{th}$ group of random numbers as a minuend and using a product of the $k^{th}$ challenge value and a random number e as a subtrahend; obtaining a second proof value by using a random number $y_k$ included in the $k^{th}$ group of random numbers as a minuend and using a product of the $k^{th}$ challenge value, a random number e, and the element u as a subtrahend; and obtaining a third proof value by using a random number $z_k$ included in the $k^{th}$ group of random numbers as an addend and using a product of the $k^{th}$ challenge value and the random number r as another addend; and for the $j^{th}$ group of proof values when j is unequal to k, using a random number $x_j$ included in the $j^{th}$ group of random numbers as the first proof value, using a random number $y_j$ included in the $j^{th}$ group of random numbers as a second proof value, and using a random number $z_j$ included in the $j^{th}$ group of random numbers as a third proof value.

For example, for all $j \in [\eta]$, the following $j^{th}$ group of proof values is constructed:

when j=k, the $k^{th}$ group of proof values includes $s_{1,k}=x_k-c_k \cdot e, s_{2,k}=y_k-c_k \cdot eu, s_{3,k}=z_k+c_k \cdot r$; and when $j \in [\eta]/k$, the $j^{th}$ group of proof values includes $s_{1,j}=x_j, s_{2,j}=y_j, s_{3,j}=z_j$.

Then, in step 29, the user equipment sends, to the verifier device, the η groups of data proofs formed by using the η groups of proof values and the corresponding challenge values. It can be understood that the above-mentioned data proof is used to prove, to the verifier device, that the user equipment owns an element in the subset S'.

For example, the user equipment returns the data proof proof=$\{c_j, s_{1,j}, s_{2,j}, s_{3,j}\}_{j \in [\eta]}$ to the verifier device.

Finally, in step 210, the verifier device verifies whether the η groups of random statements, the η challenge values, and the η group of proof values satisfy the preset relationship, to determine whether the element u owned by the user equipment belongs to the subset S'. It can be understood that the verifier device cannot learn of a specific element that is in the subset S' and that is the element u.

In an example, determining whether the element u owned by the user equipment belongs to the subset S' includes:

verifying whether a first equation, a second equation, and a third equation are satisfied, where the first equation is used to represent a relationship between the η challenge values and the random challenge c, the second equation is used to represent a relationship between the η groups of random statements and the η groups of proof values, and the third equation is used to represent a relationship between a public value and the evidence σ; and when the first equation, the second equation, and the third equation are all satisfied, determining that the element u owned by the user equipment belongs to the subset S'; or when at least one of the first equation, the second equation, and the third equation is not satisfied, determining that the element u owned by the user equipment does not belong to the subset S'.

In this example, whether a public value provided by the user equipment is satisfied is verified by verifying whether the three equations are satisfied, to determine whether the user equipment owns an element u that belongs to the subset S' specified by the verifier device.

Further, the first equation is that the sum of the η challenge values is equal to the random challenge c.

For example, verifying whether the first equation is satisfied can be expressed as $$\sum\nolimits_{j=1}^{\eta} c_j = ?\, c.$$

Further, the parameter set includes a first parameter $\tilde{g}$ and a second parameter $g_1$, the first parameter $\tilde{g}$ and the second parameter $g_1$ are two group generators in an elliptic curve group $\mathbb{G}_1$, the evidence σ includes an encryption value A and a random number r, and the method further includes:

The verifier device receives, from the user equipment, a processing value corresponding to the encryption value A, where the processing value is obtained by performing an exponential operation by using the encryption value A as a base and using a random number e as an exponent; and verifying whether the second equation is satisfied includes:

obtaining the $j^{th}$ group of first calculation results based on a second public value, the $j^{th}$ challenge value, the first parameter $\tilde{g}$, the second parameter $g_1$, the processing value, and the $j^{th}$ group of proof values;

obtaining the $j^{th}$ group of second calculation results based on a first public value, the $j^{th}$ challenge value, the first parameter $\tilde{g}$, and the $j^{th}$ group of proof values;

obtaining the $j^{th}$ group of third calculation results based on a third public value, the $j^{th}$ challenge value, the first parameter $\tilde{g}$, and the $j^{th}$ group of proof values; and if a first statement value included in the $j^{th}$ group of random statements is equal to the $j^{th}$ group of first calculation results, a second statement value included in the $j^{th}$ group of random statements is equal to the $j^{th}$ group of second calculation results, and a third statement value included in the $j^{th}$ group of random statements is equal to the $j^{th}$ group of third calculation results, determining that the second equation is satisfied.

For example, the random number is $$e \xleftarrow{\$} \mathbb{Z}_p,$$

the processing value is represented as $\overline{A}=A^e$, and verifying whether the second equation is satisfied can be represented as follows: For all $j \in [\eta]$, $$rnd_{1,j} = ?\overline{B}^{c_j} \cdot g_1^{s_{1,j}} \cdot \tilde{g}^{s_{2,j}} \cdot \overline{A}^{s_{3,j}},$$

$rnd_{2,j}=?(\tilde{g}^e)^{c_j} \cdot \tilde{g}^{s_{1,j}}$, and $rnd_{3,j}=?(\tilde{g}^{eu_j})^{c_j} \cdot \tilde{g}^{s_{2,j}}$.

Further, the parameter set includes a third parameter $g_2$, the third parameter $g_2$ is a group generator in an elliptic curve group $\mathbb{G}_2$, the evidence σ includes an encryption value A and a random number r, the encryption value A is obtained by encrypting the element u by using a private key, and a public key is disclosed to the verifier device, and the method further includes:

The verifier device receives, from the user equipment, a processing value corresponding to the encryption value A, where the processing value is obtained by performing an exponential operation by using the encryption value A as a base and using a random number e as an exponent; and verifying whether the third equation is satisfied includes:

performing bilinear mapping for a second public value and a common parameter $g_2$, to obtain a first mapping result;

performing bilinear mapping for the processing value and the public key, to obtain a second mapping result; and when the first mapping result is equal to the second mapping result, determining that the third equation is satisfied.

For example, the random number is $$e \xleftarrow{\$} \mathbb{Z}_p,$$

the processing value is represented as $\overline{A}=A^e$, and verifying whether the third equation is satisfied can be represented as $e(\overline{B}, g_2)=?e(\overline{A}, pk)$.

In this embodiment of this specification, to verify whether the user equipment owns an element u that belongs to the subset S' specified by the verifier device, the following stages are included: an evidence issuing stage and a subset membership proof stage. The evidence issuing stage is also referred to as a certificate issuing stage, and is mainly used by the third party to issue the evidence σ to prove, to the user equipment, that the element u belongs to the set S, and disclose the set S and the parameter set to the user equipment and the verifier device. The subset membership proof stage is mainly used by the user equipment to prove, to the verifier device based on the evidence σ, that the user equipment owns an element in the subset S'. An interaction procedure shown in FIG. 2 corresponds to the subset membership proof stage.

The following shows an example of an entire processing process of the evidence issuing stage and the subset membership proof stage. For ease of description, the issuer (also referred to as an issuing party), the prover, and the verifier are used as subjects for description. It can be understood that the issuer corresponds to the above-mentioned third party, the prover corresponds to the above-mentioned user equipment, and the verifier corresponds to the above-mentioned verifier device.

The evidence issuing stage includes the following processing procedure:

The issuer determines a set S, and discloses the set S to the prover and the verifier.

The issuer runs BBS.Setup($1^\lambda$, 1)→pp=(p, $g_1 \in \mathbb{G}_1$, $\tilde{g} \in \mathbb{G}_1$, $g_2 \in \mathbb{G}_2$, $\mathbb{G}_1$, $\mathbb{G}_2$, $\mathbb{G}_t$, e), and discloses pp to the prover and the verifier.

The issuer runs BBS.KeyGen(pp), and $$x \xleftarrow{\$} \mathbb{Z}_p.$$

To be specific, an element x is randomly selected from a group $\mathbb{Z}_p$, the element x is used as a private key sk=x, a public key is $$pk = g_2^x,$$

a public and private key pair (sk,pk) is obtained, and the public key is disclosed to the prover and the verifier.

The prover applies for a certificate of u.

The issuer verifies u∈S, invokes BBS.Sign(sk, x), specifically selects a random number $$r \xleftarrow{\$} \mathbb{Z}_p, \text{ calculates } A = C^{\frac{1}{x+r}} \in \mathbb{G}_1,$$

obtains a signature σ=(A,r), and returns σ to the prover as an evidence (or a certificate).

The prover receives the evidence σ=(A,r) of u, and runs a verification algorithm BBS.Verify(pk, u, σ), that is, calculates $C=g_1\tilde{g}^u$. If $$e(A, g_2^r pk) = e(C, g_2),$$

verification succeeds, the evidence issuing stage ends, and the prover stores the evidence.

The subset membership proof stage is used by the prover to prove, to the verifier, that an element u owned by the prover belongs to a subset S' specified by the verifier, including the following processing procedure:

The verifier specifies any non-empty subset S'⊆S, assumes a size of the set to |S'|=η, and sends the non-empty subset S'⊆S to the verifier.

The prover selects a random number $$e \xleftarrow{\$} \mathbb{Z}_p,$$

$\overline{A}=A^e$, and calculates and sends $\tilde{g}^e$, $$\overline{B} = g_1^e \tilde{g}^{eu} \overline{A}^{-r}$$

to the verifier as two public values of a ZKP statement. $\overline{A}$ is also sent to the verifier.

After receiving $\tilde{g}^e$, $\overline{B}$, the verifier calculates $\{\tilde{g}^{eu_j}\}_{u_j \in S'}$ for all elements $u_j \in S'$, $j \in [\eta]$ in the non-empty subset S'. Finally, the verifier can obtain a complete ZKP statement: Public values are $\overline{B}$, $\tilde{g}^e$, $\{\tilde{g}^{eu_j}\}_{j \in [\eta]}$.

The verifier verifies whether the non-empty subset S' is a subset of the total set S. If verification succeeds, the verifier starts to calculate a random statement, and assumes that the element u owned by the prover is equal to the $k^{th}$ element in the subset S', that is $u=u_k$. For all $j \in [\eta]$, the following operations are performed:

selecting a random number $x_j$, $y_j$, $z_j$, $w_j$, and when j=k, assuming $w_k=0$.

$$rnd_{1,j} = \overline{B}^{w_j} \cdot g_1^{x_j} \cdot \tilde{g}^{y_j} \cdot \overline{A}^{z_j};$$

$$rnd_{2,j} = \tilde{g}^{ew_j} \cdot \tilde{g}^{x_j}; \text{ and}$$

$$rnd_{3,j} = \tilde{g}^{eu_j w_j} \cdot \tilde{g}^{y_j}.$$

The prover sends the random statement $rnd=\{rnd_{1,j}, rnd_{2,j}, rnd_{3,j}\}_{j \in [\eta]}$ to the verifier.

The verifier selects a random challenge $$c \overset{\$}{\leftarrow} \mathbb{Z}_p,$$

and sends the random challenge $$c \overset{\$}{\leftarrow} \mathbb{Z}_p$$

to the verifier.

The prover constructs $\eta$ challenge values of a challenge c, and $$\left\{c_1 = w_1, \ldots, c_k = c - \sum\nolimits_{j=1}^{\eta} w_j, \ldots, c_\eta = w_\eta\right\}.$$

The prover calculates a proof value for all $j \in [\eta]$:

when j=k, the proof value is $s_{1,k}=x_k-c_k \cdot e$, $s_{2,k}=y_k-c_k \cdot eu$, $s_{3,k}=z_k+c_k \cdot r$; and when $j \in [\eta]/k$, the proof value is $s_{1,j}=x_j$, $s_{2,j}=y_j$, $s_{3,j}=z_j$.

The prover returns the proof $proof=\{c_j, s_{1,j}, s_{2,j}, s_{3,j}\}_{j \in [\eta]}$ to the verifier.

Finally, the verifier verifies whether the public values $\overline{B}$, $\tilde{g}^e$, $\{\tilde{g}^{eu_j}\}_{j \in [\eta]}$ provided by the prover are satisfied, to verify whether the prover owns an element u belonging to the subset S' specified by the verifier. The following equation needs to be verified:

$$e(\overline{B}, g_2) = ?\, e(\overline{A}, \text{pk});$$

$$\sum\nolimits_{j=1}^{\eta} c_j = ?\, c; \text{ and}$$

$$\text{for all } j \in [\eta],\ rnd_{1,j} = ?\, \overline{B}^{c_j} \cdot g_1^{s_{1,j}} \cdot \tilde{g}^{s_{2,j}} \cdot \overline{A}^{s_{3,j}},$$

$$rnd_{2,j} = ?\, (\tilde{g}^e)^{c_j} \cdot \tilde{g}^{s_{1,j}}, \text{ and } rnd_{3,j} = ?\, (\tilde{g}^{eu_j})^{c_j} \tilde{g}^{s_{2,j}}.$$

If all the above-mentioned equations are satisfied, verification succeeds; otherwise, verification fails.

According to the method provided in the embodiments of this specification, the user equipment owns the element u and the evidence σ issued by the third party to prove that the element u belongs to the set S. The verifier device owns the set S. First, the user equipment receives, from the verifier device, the subset S' whose size is η in the set S, and determines that the element u is the $k^{th}$ element in the subset S'. Then, the user equipment and the verifier device each obtain three public values, and the user equipment calculates η groups of random statements, and sends the η groups of random statements to the verifier device. Next, the user equipment receives the random challenge c from the verifier device, and constructs the η challenge values based on the random challenge c. The $k^{th}$ challenge value is calculated in a manner different from that of another challenge value. The user equipment constructs the η groups of proof values. Finally, the user equipment sends the η groups of data proofs formed by using the η groups of proof values and the corresponding challenge values to the verifier device. The verifier device verifies whether the η groups of random statements, the η challenge values, and the η groups of proof values satisfy the preset relationship, to determine whether the element u owned by the user equipment belongs to the subset S'. In this solution, the elements u and the evidence σ that are owned by the user equipment are not disclosed. Based on a basic framework of a zero-knowledge proof, a membership proof for a dynamic subset cannot be efficiently implemented.

Figure 3:
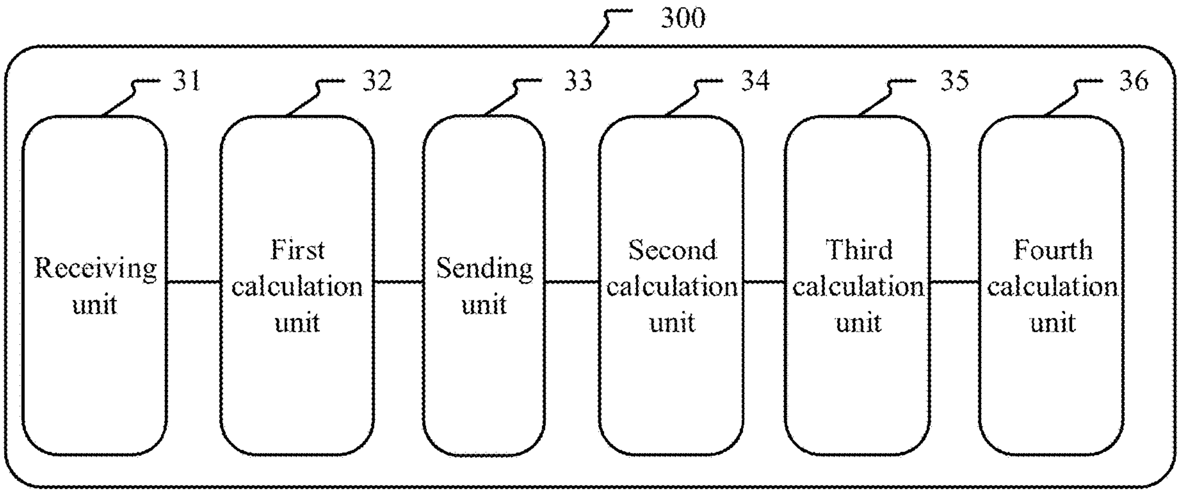
FIG. 3 is a schematic block diagram of a zero-knowledge set membership proof apparatus according to an embodiment.

According to an embodiment in another aspect, a zero-knowledge set membership proof apparatus is further provided. The apparatus is configured to perform the zero-knowledge set membership proof method provided in the embodiments of the specification. The apparatus is disposed in user equipment, and the user equipment owns an element u and an evidence issued by a third party to prove that the element u belongs to a set S. FIG. 3 is a schematic block diagram of a zero-knowledge set membership proof apparatus according to an embodiment. As shown in FIG. 3, the apparatus 300 includes:

a receiving unit 31, configured to: receive, from a verifier device, a subset S' whose size is η in the set S, and determine that the element u is the $k^{th}$ element in the subset S';

a first calculation unit 32, configured to: calculate two public values based on a parameter set disclosed by the third party, the element u, and the evidence σ, and send the two public values to the verifier device by using a sending unit 33, so that the verifier device calculates a third public value based on the sent public values and each element in the subset S';

a second calculation unit 34, configured to: calculate η groups of random statements based on η groups of generated random numbers and the above-mentioned three public values, and send the η groups of random statements to the verifier device by using the sending unit 33, where the receiving unit 31 is further configured to receive a random challenge c from the verifier device;

a third calculation unit 35, configured to construct η challenge values based on the η groups of random numbers and the random challenge c received by the receiving unit 31, where the $k^{th}$ challenge value is calculated in a manner different from that of another challenge value; and a fourth calculation unit 36, configured to construct η groups of proof values, where the $k^{th}$ group of proof values is determined based on the $k^{th}$ group of random numbers, the $k^{th}$ challenge value obtained by the third calculation unit, and the element u, and another group of proof values is determined based on a corresponding group of random numbers, where the sending unit 33 is further configured to send η groups of data proofs formed by using η groups of proof values obtained by the fourth calculation unit 36 and corresponding challenge values obtained by the third calculation unit 35 to the verifier device, so that the verifier device verifies whether the η groups of random statements, the η challenge values, and the η group of proof values satisfy a preset relationship, to determine whether the element u owned by the user equipment belongs to the subset S'.

Optionally, in an embodiment, the parameter set includes a first parameter $\tilde{g}$ and a second parameter $g_1$. The first calculation unit 32 includes:

a first selection subunit, configured to select a random number e;

a first calculation subunit, configured to calculate a first public value based on a random number e obtained by the first selection subunit and a first parameter $\tilde{g}$; and a second calculation subunit, configured to calculate a second public value based on the random number e obtained by the first selection subunit, the first parameter $\tilde{g}$, a second parameter $g_1$, the element u, and the evidence σ.

Further, the parameter set further includes a third parameter p. The first selection subunit is specifically configured to randomly select an element from an integer multiplication group $\mathbb{Z}_p$ whose modulus is the third parameter p, to obtain a random number e.

Further, the first parameter $\tilde{g}$ is a group generator in an elliptic curve group $\mathbb{G}_1$, and the first calculation subunit is specifically configured to perform an exponential operation by using the first parameter $\tilde{g}$ as a base and by using the random number e as an exponent, to obtain the first public value.

Further, the first parameter $\tilde{g}$ and the second parameter $g_1$ are two group generators in an elliptic curve group $\mathbb{G}_1$, the evidence σ includes an encryption value A and a random number r, and the second calculation subunit is specifically configured to:

perform an exponential operation by using the second parameter $g_1$ as a base and using the random number e as an exponent, to obtain a first intermediate value;

perform an exponential operation by using the first parameter $\tilde{g}$ as a base and using a product of the random number e and the element u as an exponent, to obtain a second intermediate value;

perform an exponential operation by using the encryption value A as a base and using an opposite number of a product of the random number e and the random number r as an exponent, to obtain a third intermediate value; and perform a multiplication operation on the first intermediate value, the second intermediate value, and the third intermediate value, to obtain the second open value.

Further, the third public value is η exponential operation result obtained by performing an exponential operation by using the first public value as a base and using each element in the subset S' as an exponent.

Further, the first parameter $\tilde{g}$ and the second parameter $g_1$ are two group generators in an elliptic curve group $\mathbb{G}_1$, and the second calculation unit 34 includes:

a third calculation subunit, configured to calculate a first statement value in a target group of random statements based on the second public value, the first parameter $\tilde{g}$, the second parameter $g_1$, the evidence σ, the random number e, and a target group of random numbers;

a fourth calculation subunit, configured to calculate a second statement value in the target group of random statements based on the first public value, the first parameter $\tilde{g}$, and the target group of random numbers; and a fifth calculation subunit, configured to calculate a third statement value in the target group of random statements based on the third public value, the first parameter $\tilde{g}$, and the target group of random numbers.

Further, the evidence σ includes an encryption value A and a random number r, and the third calculation subunit is specifically configured to:

perform an exponential operation by using the second public value as a base and using a random number $w_j$ in the $j^{th}$ group of random numbers as an exponent, to obtain a first multiplier;

perform an exponential operation by using the second parameter $g_1$ as a base and using a random number $x_j$ in the $j^{th}$ group of random numbers as an exponent, to obtain a second multiplier;

perform an exponential operation by using the first parameter $\tilde{g}$ as a base and using a random number $y_j$ in the $j^{th}$ group of random numbers as an exponent, to obtain a third multiplier;

perform an exponential operation by using the encryption value A as a base and using a product of the random number e and a random number $z_j$ in the $j^{th}$ group of random numbers as an exponent, to obtain a fourth multiplier; and perform a multiplication operation on the first multiplier, the second multiplier, the third multiplier, and the fourth multiplier, where an obtained multiplication result is used as a first statement value in the $j^{th}$ group of random statements.

Further, the fourth calculation subunit is specifically configured to:

perform an exponential operation by using the first public value as a base and using a random number $w_j$ in the $j^{th}$ group of random numbers as an exponent, to obtain a first exponential result;

perform an exponential operation by using the first parameter $\tilde{g}$ as a base and using a random number $x_j$ in the $j^{th}$ group of random numbers as an exponent, to obtain a second exponential result; and perform a multiplication operation on the first exponential result and the second exponential result, where an obtained multiplication result is used as the second statement value in the $j^{th}$ group of random statements.

Further, the fifth calculation subunit is specifically configured to:

perform an exponential operation by using the $j^{th}$ value in η values included in the third public value as a base and using a random number $w_j$ in the $j^{th}$ group of random numbers as an exponent, to obtain a first intermediate result;

perform an exponential operation by using the first parameter $\tilde{g}$ as a base and using a random number $y_j$ in the $j^{th}$ group of random numbers as an exponent, to obtain a second intermediate result; and perform a multiplication operation on the first intermediate result and the second intermediate result, where an obtained multiplication result is used as the third statement value in the $j^{th}$ group of random statements.

Further, the random challenge c is obtained by randomly selecting an element from the integer multiplication group $\mathbb{Z}_p$ whose modulus is p.

Optionally, in an embodiment, the third calculation unit 35 includes:

a sixth calculation subunit, configured to subtract the sum of random numbers $w_j$ in the η groups of random numbers from the random challenge c, to obtain the $k^{th}$ challenge value, where j represents the $j^{th}$ group of random numbers; and a seventh calculation subunit, configured to use each random number $w_j$ in a group of random numbers other than the $k^{th}$ group of random numbers in the η groups of random numbers as the $j^{th}$ challenge value.

Optionally, in an embodiment, the evidence σ includes an encryption value A and a random number r, and the fourth calculation unit 36 includes:

an eighth calculation subunit, configured to: for the $k^{th}$ group of proof values, obtain a first proof value by using a random number $x_k$ included in the $k^{th}$ group of random numbers as a minuend and using a product of the $k^{th}$ challenge value and a random number e as a subtrahend; obtain a second proof value by using a random number $y_k$ included in the $k^{th}$ group of random numbers as a minuend and using a product of the $k^{th}$ challenge value, a random number e, and the element u as a subtrahend; and obtain a third proof value by using a random number $z_k$ included in the $k^{th}$ group of random numbers as an addend and using a product of the $k^{th}$ challenge value and the random number r as another addend; and a ninth calculation subunit, configured to: for the $j^{th}$ group of proof values when j is unequal to k, use a random number $x_j$ included in the $j^{th}$ group of random numbers as the first proof value, use a random number $y_j$ included in the $j^{th}$ group of random numbers as a second proof value, and use a random number $z_j$ included in the $j^{th}$ group of random numbers as a third proof value.

Figure 4:
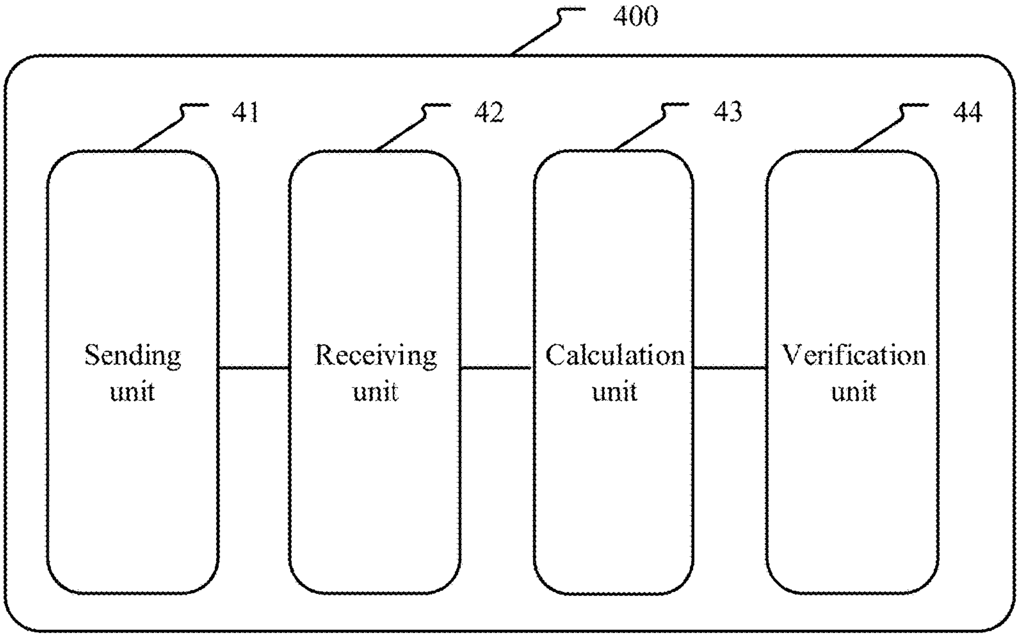
FIG. 4 is a schematic block diagram of a zero-knowledge set membership proof apparatus according to another embodiment.

According to an embodiment in another aspect, a zero-knowledge set membership proof apparatus is further provided. The apparatus is configured to perform the zero-knowledge set membership proof method provided in the embodiments of the specification. The apparatus is disposed on a verifier device, and the verifier device owns a set S. FIG. 4 is a schematic block diagram of a zero-knowledge set membership proof apparatus according to another embodiment. As shown in FIG. 4, the apparatus 400 includes:

a sending unit 41, configured to send a subset S' whose size is η in the set S to the user equipment;

a receiving unit 42, configured to receive two public values from the user equipment, where the two public values are calculated based on a parameter set disclosed by a third party, an element u, and an evidence σ issued by the third party to prove that the element u belongs to the set S;

a calculation unit 43, configured to calculate a third public value based on the two public values received by the receiving unit 42 and each element in the subset S', where the receiving unit 42 is further configured to receive η groups of random statements from the user equipment, where the η groups of random statements are calculated based on the η groups of generated random numbers and the above-mentioned three public values;

the sending unit 41 is further configured to send a random challenge c to the user equipment; and the receiving unit 42 is further configured to receive, from the user equipment, η groups of data proofs formed by using η groups of proof values and corresponding challenge values, where the η challenge values are constructed by using the η groups of random numbers and the random challenge c, the $k^{th}$ challenge value is calculated in a manner different from that of another challenge value, the $k^{th}$ group of proof values is determined based on the $k^{th}$ group of random numbers, the $k^{th}$ challenge value, and the element u, and another group of proof values is determined based on a corresponding group of random numbers; and a verification unit 44, configured to verify whether the η groups of random statements received by the receiving unit 42, the η challenge values, and the η group of proof values satisfy a preset relationship, to determine whether the element u owned by the user equipment belongs to the subset S'.

Optionally, in an embodiment, the verification unit 44 includes:

a verification subunit, configured to verify whether a first equation, a second equation, and a third equation are satisfied, where the first equation is used to represent a relationship between the η challenge values and the random challenge c, the second equation is used to represent a relationship between the η groups of random statements and the η groups of proof values, and the third equation is used to represent a relationship between a public value and the evidence σ; and a first determining subunit, configured to: when the first equation, the second equation, and the third equation are all satisfied, determine that the element u owned by the user equipment belongs to the subset S'; or a second determining subunit, configured to: when at least one of the first equation, the second equation, and the third equation is not satisfied, determine that the element u owned by the user equipment does not belong to the subset S'.

Further, the first equation is that the sum of the η challenge values is equal to the random challenge c.

Further, the parameter set includes a first parameter $\tilde{g}$ and a second parameter $g_1$, the first parameter $\tilde{g}$ and the second parameter $g_1$ are two group generators in an elliptic curve group $\mathbb{G}_1$, the evidence σ includes an encryption value A and a random number r, and the receiving unit 42 is further configured to receive, from the user equipment, a processing value corresponding to the encryption value A, where the processing value is obtained by performing an exponential operation by using the encryption value A as a base and using a random number e as an exponent; and the verification subunit is specifically configured to:

obtain the $j^{th}$ group of first calculation results based on a second public value, the $j^{th}$ challenge value, the first parameter $\tilde{g}$, the second parameter $g_1$, the processing value, and the $j^{th}$ group of proof values;

obtain the $j^{th}$ group of second calculation results based on a first public value, the $j^{th}$ challenge value, the first parameter $\tilde{g}$, and the $j^{th}$ group of proof values;

obtain the $j^{th}$ group of third calculation results based on a third public value, the $j^{th}$ challenge value, the first parameter $\tilde{g}$, and the $j^{th}$ group of proof values; and if a first statement value included in the $j^{th}$ group of random statements is equal to the $j^{th}$ group of first calculation results, a second statement value included in the $j^{th}$ group of random statements is equal to the $j^{th}$ group of second calculation results, and a third statement value included in the $j^{th}$ group of random statements is equal to the $j^{th}$ group of third calculation results, determine that the second equation is satisfied.

Further, the parameter set includes a third parameter $g_2$, the third parameter $g_2$ is a group generator in an elliptic curve group $\mathbb{G}_2$, the evidence σ includes an encryption value A and a random number r, the encryption value A is obtained by encrypting the element u by using a private key, and a public key is disclosed to the verifier device, and the receiving unit 42 is further configured to receive, from the user equipment, a processing value corresponding to the encryption value A, where the processing value is obtained by performing an exponential operation by using the encryption value A as a base and using a random number e as an exponent; and the verification subunit is specifically configured to:

perform bilinear mapping for a second public value and a common parameter $g_2$, to obtain a first mapping result;

perform bilinear mapping for the processing value and the public key, to obtain a second mapping result; and when the first mapping result is equal to the second mapping result, determine that the third equation is satisfied.

According to the apparatuses provided in this embodiment of this specification, the user equipment owns the element u and the evidence σ issued by the third party to prove that the element u belongs to the set S. The verifier device owns the set S. First, the receiving unit 31 of the user equipment receives, from the verifier device, the subset S' whose size is η in the set S, and determines that the element u is the $k^{th}$ element in the subset S'. Then, the first calculation unit 32 and the sending unit 33 enable the user equipment and the verifier device to each obtain three public values, and the second calculation unit 34 of the user equipment calculates η groups of random statements, and sends the η groups of random statements to the verifier device. Next, the receiving unit 31 of the user equipment receives the random challenge c from the verifier device, and the third calculation unit 35 constructs the η challenge values by using the random challenge c. The $k^{th}$ challenge value is calculated in a manner different from that of another challenge value. The fourth calculation unit 36 of the user equipment constructs the η groups of proof values. Finally, the sending unit 33 of the user equipment sends the η groups of data proofs formed by using the η groups of proof values and the corresponding challenge values to the verifier device. The verification unit 44 of the verifier device verifies whether the η groups of random statements, the η challenge values, and the η groups of proof values satisfy the preset relationship, to determine whether the element u owned by the user equipment belongs to the subset S'. In this solution, the elements u and the evidence σ that are owned by the user equipment are not disclosed. Based on a basic framework of a zero-knowledge proof, a membership proof for a dynamic subset cannot be efficiently implemented.

According to an embodiment in another aspect, a computer-readable storage medium is further provided. The computer-readable storage medium stores a computer program. When the computer program is executed in a computer, the computer is enabled to perform the method described with reference to FIG. 2.

According to an embodiment in still another aspect, a computing device is further provided, including a memory and a processor. The memory stores executable code, and when executing the executable code, the processor implements the method described with reference to FIG. 2.

A person skilled in the art should be aware that in the above-mentioned one or more examples, the functions described in the present invention can be implemented by hardware, software, firmware, or any combination thereof. When implemented by software, the functions can be stored in a computer-readable medium or transmitted as one or more instructions or code on a computer-readable medium.

The objectives, technical solutions, and benefits of this specification are further described in detail in the specific implementations described above. It should be understood that the above-mentioned descriptions are merely specific implementations of this specification, but are not intended to limit the protection scope of this specification. Any modification, equivalent replacement, or improvement made based on the technical solutions of this specification shall fall within the protection scope of this specification.

The invention claimed is:

1. A zero-knowledge set membership proof method, performed by user equipment, wherein the user equipment owns an element u and an evidence σ issued by a third party to prove that the element u belongs to a set S, and the method comprises:

receiving, from a verifier device, a subset S' whose size is η in the set S, and determining that the element u is the $k^{th}$ element in the subset S';

calculating two public values based on a parameter set disclosed by the third party, the element u, and the evidence σ, and sending the two public values to the verifier device, so that the verifier device calculates a third public value based on the sent public values and each element in the subset S';

calculating η groups of random statements based on n groups of generated random numbers and the above-mentioned three public values, and sending the n groups of random statements to the verifier device;

receiving a random challenge c from the verifier device;

constructing η challenge values based on the n groups of random numbers and the random challenge c, wherein the $k^{th}$ challenge value is calculated in a manner different from that of another challenge value;

constructing η groups of proof values, wherein the $k^{th}$ group of proof values is determined based on the $k^{th}$ group of random numbers, the $k^{th}$ challenge value, and the element u, and another group of proof values is determined based on a corresponding group of random numbers; and sending η groups of data proofs formed by using η groups of proof values and corresponding challenge values to the verifier device, so that the verifier device verifies whether the η groups of random statements, the n challenge values, and the n group of proof values satisfy a preset relationship, to determine whether the element u owned by the user equipment belongs to the subset S'.

2. The method according to claim 1, wherein the parameter set comprises a first parameter $\tilde{g}$ and a second parameter $g_1$, and calculating the two public values based on the parameter set disclosed by the third party, the element u, and the evidence σ comprises:

selecting a random number e;

calculating a first public value based on a random number e and a first parameter $\tilde{g}$; and calculating a second public value based on the random number e, the first parameter $\tilde{g}$, a second parameter $g_1$, the element u, and the evidence σ.

3. The method according to claim 2, wherein the parameter set further comprises a third parameter p, and selecting the random number e comprises:

randomly selecting an element from an integer multiplication group $\mathbb{Z}_p$ whose modulus is the third parameter p, to obtain a random number e.

4. The method according to claim 3, wherein the first parameter $\tilde{g}$ is a group generator in an elliptic curve group $\mathbb{G}_1$, and calculating the first public value based on the random number e and the first parameter $g^{\sim}$ comprises:

performing an exponential operation by using the first parameter $\tilde{g}$ as a base and by using the random number e as an exponent, to obtain the first public value.

5. The method according to claim 3, wherein the first parameter $\tilde{g}$ and the second parameter $g_1$ are two group generators in an elliptic curve group $\mathbb{G}_1$, the evidence σ comprises an encryption value A and a random number r, and calculating the second public value based on the random number e, the first parameter $\tilde{g}$, the second parameter $g_1$, the element u, and the evidence σ comprises:

performing an exponential operation by using the second parameter $g_1$ as a base and using the random number e as an exponent, to obtain a first intermediate value;

performing an exponential operation by using the first parameter $\tilde{g}$ as a base and using a product of the random number e and the element u as an exponent, to obtain a second intermediate value;

performing an exponential operation by using the encryption value A as a base and using an opposite number of a product of the random number e and the random number r as an exponent, to obtain a third intermediate value; and performing a multiplication operation on the first intermediate value, the second intermediate value, and the third intermediate value, to obtain the second open value.

6. The method according to claim 3, wherein the third public value is η exponential operation result obtained by performing an exponential operation by using the first public value as a base and using each element in the subset S' as an exponent.

7. The method according to claim 3, wherein the first parameter $\tilde{g}$ and the second parameter $g_1$ are two group generators in an elliptic curve group $\mathbb{G}_1$, and calculating the η groups of random statements based on the η groups of generated random numbers and the above-mentioned three public values comprises:

calculating a first statement value in a target group of random statements based on the second public value, the first parameter $\tilde{g}$, the second parameter $g_1$, the evidence σ, the random number e, and a target group of random numbers;

calculating a second statement value in the target group of random statements based on the first public value, the first parameter $\tilde{g}$, and the target group of random numbers; and calculating a third statement value in the target group of random statements based on the third public value, the first parameter $\tilde{g}$, and the target group of random numbers.

8. The method according to claim 7, wherein the evidence σ comprises an encryption value A and a random number r, and calculating the first statement value in the target group of random statements comprises:

performing an exponential operation by using the second public value as a base and using a random number $w_j$ in the $j^{th}$ group of random numbers as an exponent, to obtain a first multiplier;

performing an exponential operation by using the second parameter $g_1$ as a base and using a random number $x_j$ in the $j^{th}$ group of random numbers as an exponent, to obtain a second multiplier;

performing an exponential operation by using the first parameter $\tilde{g}$ as a base and using a random number $y_j$ in the $j^{th}$ group of random numbers as an exponent, to obtain a third multiplier;

performing an exponential operation by using the encryption value A as a base and using a product of the random number e and a random number $z_j$ in the $j^{th}$ group of random numbers as an exponent, to obtain a fourth multiplier; and performing a multiplication operation on the first multiplier, the second multiplier, the third multiplier, and the fourth multiplier, wherein an obtained multiplication result is used as a first statement value in the $j^{th}$ group of random statements.

9. The method according to claim 7, wherein calculating the second statement value in the target group of random statements comprises:

performing an exponential operation by using the first public value as a base and using a random number $w_j$ in the $j^{th}$ group of random numbers as an exponent, to obtain a first exponential result;

performing an exponential operation by using the first parameter § as a base and using a random number $x_j$ in the $j^{th}$ group of random numbers as an exponent, to obtain a second exponential result; and performing a multiplication operation on the first exponential result and the second exponential result, wherein an obtained multiplication result is used as the second statement value in the $j^{th}$ group of random statements.

10. The method according to claim 7, wherein calculating the third statement value in the target group of random statements comprises:

performing an exponential operation by using the $j^{th}$ value in n values comprised in the third public value as a base and using a random number $w_j$ in the $j^{th}$ group of random numbers as an exponent, to obtain a first intermediate result;

performing an exponential operation by using the first parameter $\tilde{g}$ as a base and using a random number $y_j$ in the $j^{th}$ group of random numbers as an exponent, to obtain a second intermediate result; and performing a multiplication operation on the first intermediate result and the second intermediate result, wherein an obtained multiplication result is used as the third statement value in the $j^{th}$ group of random statements.

11. The method according to claim 3, wherein the random challenge c is obtained by randomly selecting an element from the integer multiplication group $\mathbb{Z}_p$ whose modulus is p.

12. The method according to claim 1, wherein constructing the n challenge values comprises:

subtracting the sum of random numbers $w_j$ in the η groups of random numbers from the random challenge c, to obtain the $k^{th}$ challenge value, wherein j represents the $j^{th}$ group of random numbers; and using each random number $w_j$ in a group of random numbers other than the $k^{th}$ group of random numbers in the η groups of random numbers as the $j^{th}$ challenge value.

13. The method according to claim 1, wherein the evidence σ comprises an encryption value A and a random number r, and constructing the η groups of proof values comprises:

for the $k^{th}$ group of proof values, obtaining a first proof value by using a random number $x_k$ comprised in the $k^{th}$ group of random numbers as a minuend and using a product of the $k^{th}$ challenge value and a random number e as a subtrahend; obtaining a second proof value by using a random number $y_k$ comprised in the $k^{th}$ group of random numbers as a minuend and using a product of the $k^{th}$ challenge value, a random number e, and the element u as a subtrahend; and obtaining a third proof value by using a random number $z_k$ comprised in the $k^{th}$ group of random numbers as an addend and using a product of the $k^{th}$ challenge value and the random number r as another addend; and for the $j^{th}$ group of proof values when j is unequal to k, using a random number $x_j$ comprised in the $j^{th}$ group of random numbers as the first proof value, using a random number $y_j$ comprised in the $j^{th}$ group of random numbers as a second proof value, and using a random number $z_j$ comprised in the $j^{th}$ group of random numbers as a third proof value.

14. A non-transitory computer-readable storage medium, wherein the non-transitory computer-readable storage medium stores a computer program, which when executed by a processor causes the processor to:

receive, from a verifier device, a subset S' whose size is η in the set S, and determine that the element u is the $k^{th}$ element in the subset S';

calculate two public values based on a parameter set disclosed by the third party, the element u, and the evidence σ, and send the two public values to the verifier device, so that the verifier device calculates a third public value based on the sent public values and each element in the subset S';

calculate η groups of random statements based on η groups of generated random numbers and the above-mentioned three public values, and send the η groups of random statements to the verifier device;

receive a random challenge c from the verifier device;

construct n challenge values based on the η groups of random numbers and the random challenge c, wherein the $k^{th}$ challenge value is calculated in a manner different from that of another challenge value;

construct η groups of proof values, wherein the $k^{th}$ group of proof values is determined based on the $k^{th}$ group of random numbers, the $k^{th}$ challenge value, and the element u, and another group of proof values is determined based on a corresponding group of random numbers; and send η groups of data proofs formed by using η groups of proof values and corresponding challenge values to the verifier device, so that the verifier device verifies whether the η groups of random statements, the η challenge values, and the η group of proof values satisfy a preset relationship, to determine whether the element u owned by the user equipment belongs to the subset S'.

15. The non-transitory computer-readable storage medium according to claim 14, wherein the parameter set comprises a first parameter g and a second parameter $g_1$, and the processor being caused to calculate the two public values based on the parameter set disclosed by the third party, the element u, and the evidence σ comprises being caused to:

select a random number e;

calculate a first public value based on a random number e and a first parameter $\tilde{g}$; and calculate a second public value based on the random number e, the first parameter $\tilde{g}$, a second parameter $g_1$, the element u, and the evidence σ.

16. The non-transitory computer-readable storage medium according to claim 15, wherein the parameter set further comprises a third parameter p, and the processor being caused to select the random number e comprises being caused to:

randomly select an element from an integer multiplication group $\mathbb{Z}_p$ whose modulus is the third parameter p, to obtain a random number e.

17. The non-transitory computer-readable storage medium according to claim 16, wherein the first parameter $\tilde{g}$ is a group generator in an elliptic curve group $\mathbb{G}_1$, and the processor being caused to calculate the first public value based on the random number e and the first parameter $\tilde{g}$ comprises being caused to:

perform an exponential operation by using the first parameter $\tilde{g}$ as a base and by using the random number e as an exponent, to obtain the first public value.

18. A computing device, comprising a memory and a processor, wherein the memory stores executable code, and when the processor executes the executable code, the computing device is caused to:

receive, from a verifier device, a subset S' whose size is η in the set S, and determine that the element u is the $k^{th}$ element in the subset S';

calculate two public values based on a parameter set disclosed by the third party, the element u, and the evidence σ, and send the two public values to the verifier device, so that the verifier device calculates a third public value based on the sent public values and each element in the subset S';

calculate η groups of random statements based on η groups of generated random numbers and the above-mentioned three public values, and send the η groups of random statements to the verifier device;

receive a random challenge c from the verifier device;

construct η challenge values based on the η groups of random numbers and the random challenge c, wherein the $k^{th}$ challenge value is calculated in a manner different from that of another challenge value;

construct η groups of proof values, wherein the $k^{th}$ group of proof values is determined based on the $k^{th}$ group of random numbers, the $k^{th}$ challenge value, and the element u, and another group of proof values is determined based on a corresponding group of random numbers; and send η groups of data proofs formed by using η groups of proof values and corresponding challenge values to the verifier device, so that the verifier device verifies whether the η groups of random statements, the η challenge values, and the η group of proof values satisfy a preset relationship, to determine whether the element u owned by the user equipment belongs to the subset S'.

19. The computing device according to claim 18, wherein the parameter set comprises a first parameter g and a second parameter $g_1$, and the computing device being caused to calculate the two public values based on the parameter set disclosed by the third party, the element u, and the evidence σ comprises being caused to:

select a random number e;

calculate a first public value based on a random number e and a first parameter $\tilde{g}$; and calculate a second public value based on the random number e, the first parameter $\tilde{g}$, a second parameter $g_1$, the element u, and the evidence σ.

20. The computing device according to claim 19, wherein the parameter set further comprises a third parameter p, and the computing device being caused to select the random number e comprises being caused to:

randomly select an element from an integer multiplication group $\mathbb{Z}_p$ whose modulus is the third parameter p, to obtain a random number e.

* * * * *